INVENTOR.
Alfred Schwarz
BY Edward H Cumpston
his Attorney

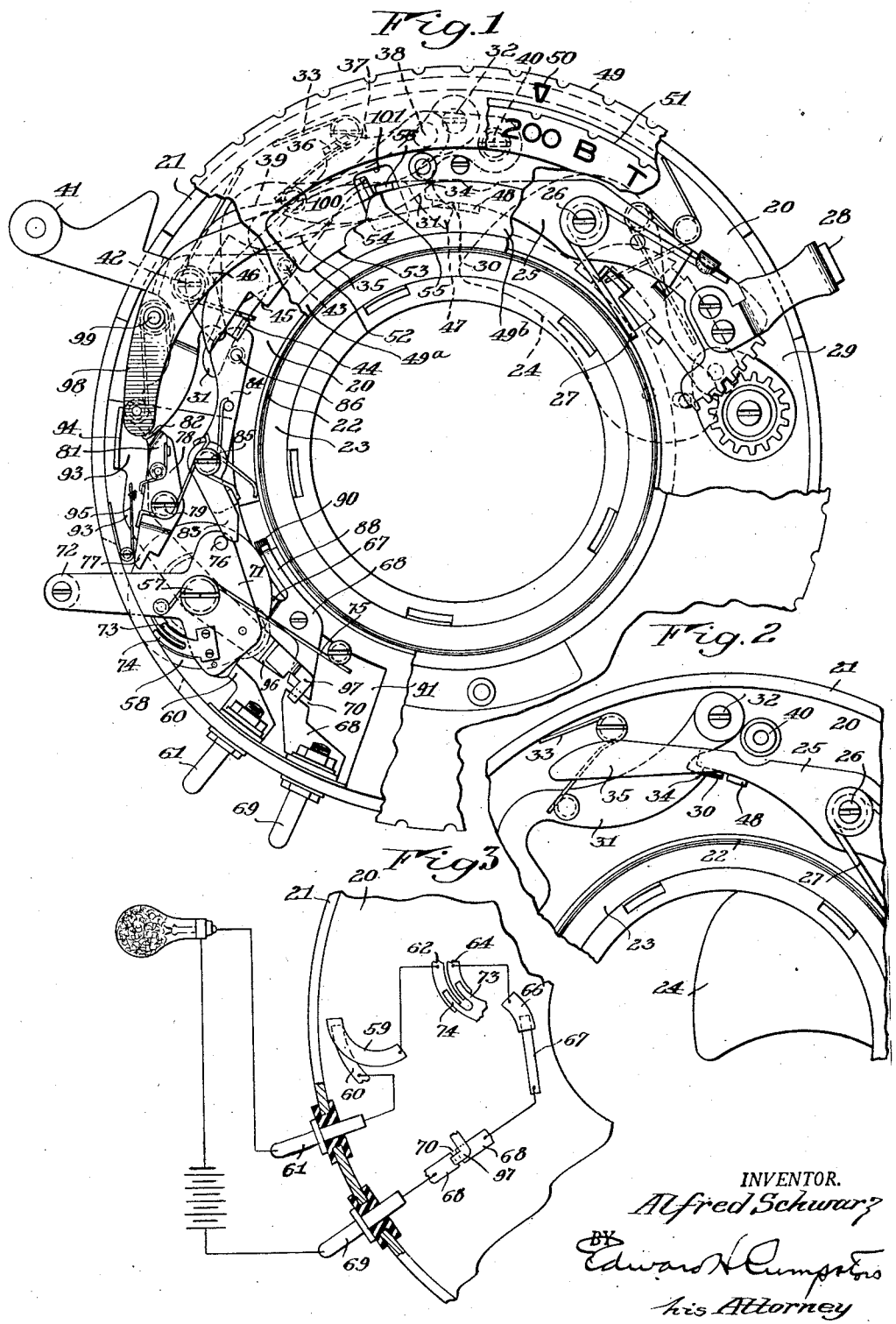

Jan. 27, 1948. A. SCHWARZ 2,435,161
PHOTOFLASH SYNCHRONIZING MECHANISM
Filed April 21, 1944 5 Sheets-Sheet 3
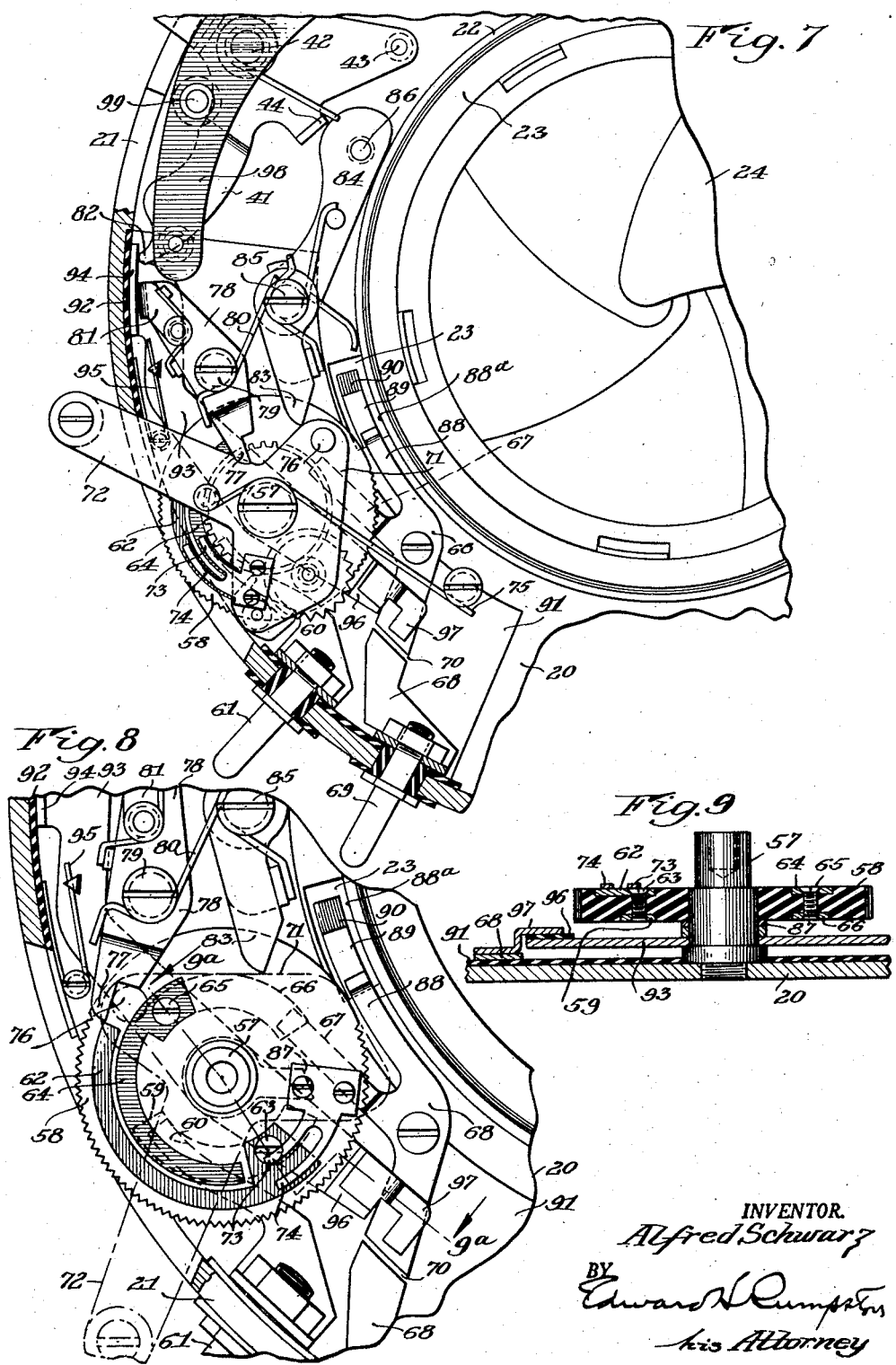
INVENTOR.
Alfred Schwarz
BY Edward H. Cumpston
his Attorney Jan. 27, 1948.  A. SCHWARZ  2,435,161
PHOTOFLASH SYNCHRONIZING MECHANISM
Filed April 21, 1944  5 Sheets-Sheet 4
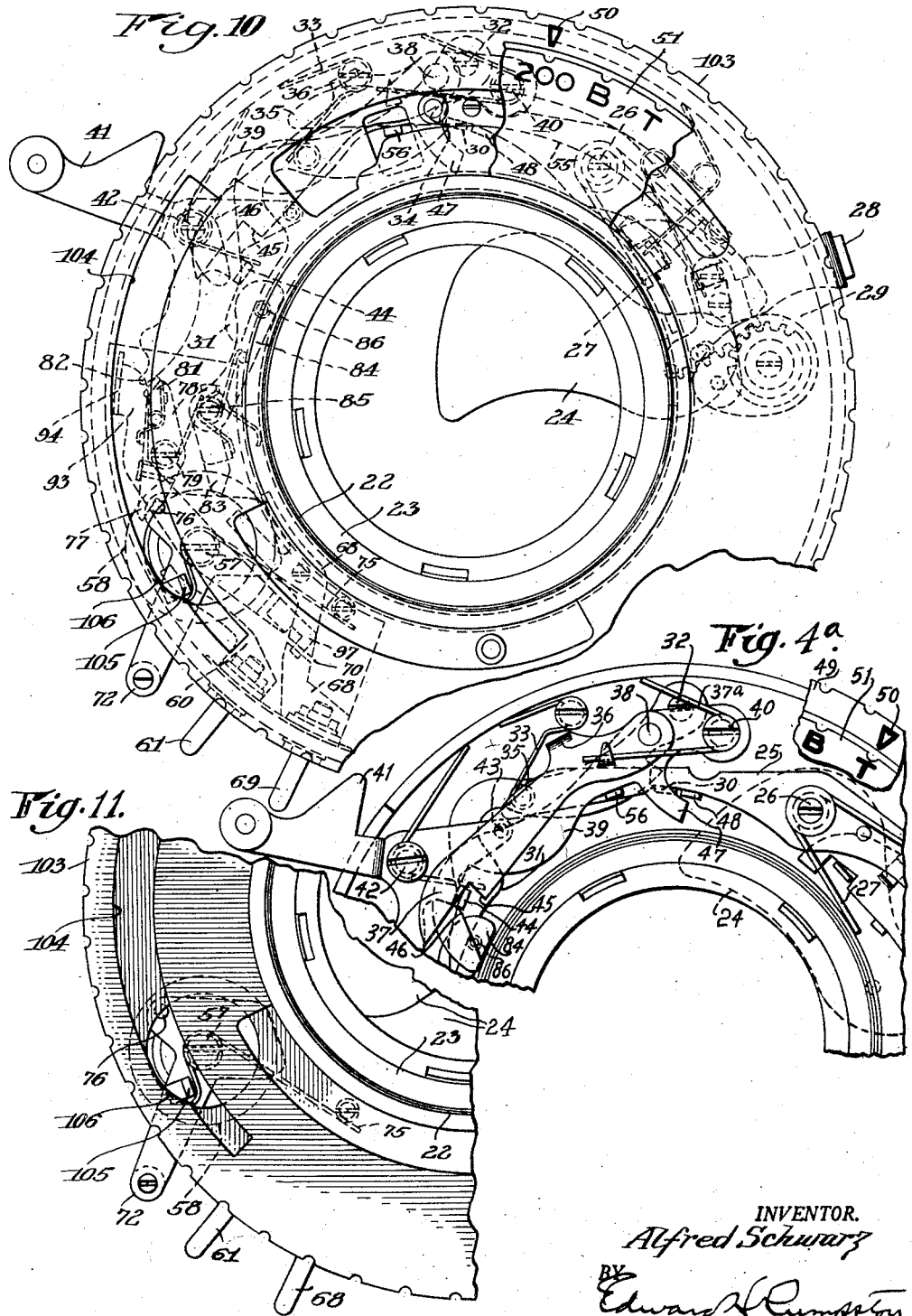
INVENTOR.
Alfred Schwarz
BY Edward H. Cumpston
his Attorney Jan. 27, 1948.    A. SCHWARZ    2,435,161
PHOTOFLASH SYNCHRONIZING MECHANISM
Filed April 21, 1944    5 Sheets-Sheet 5
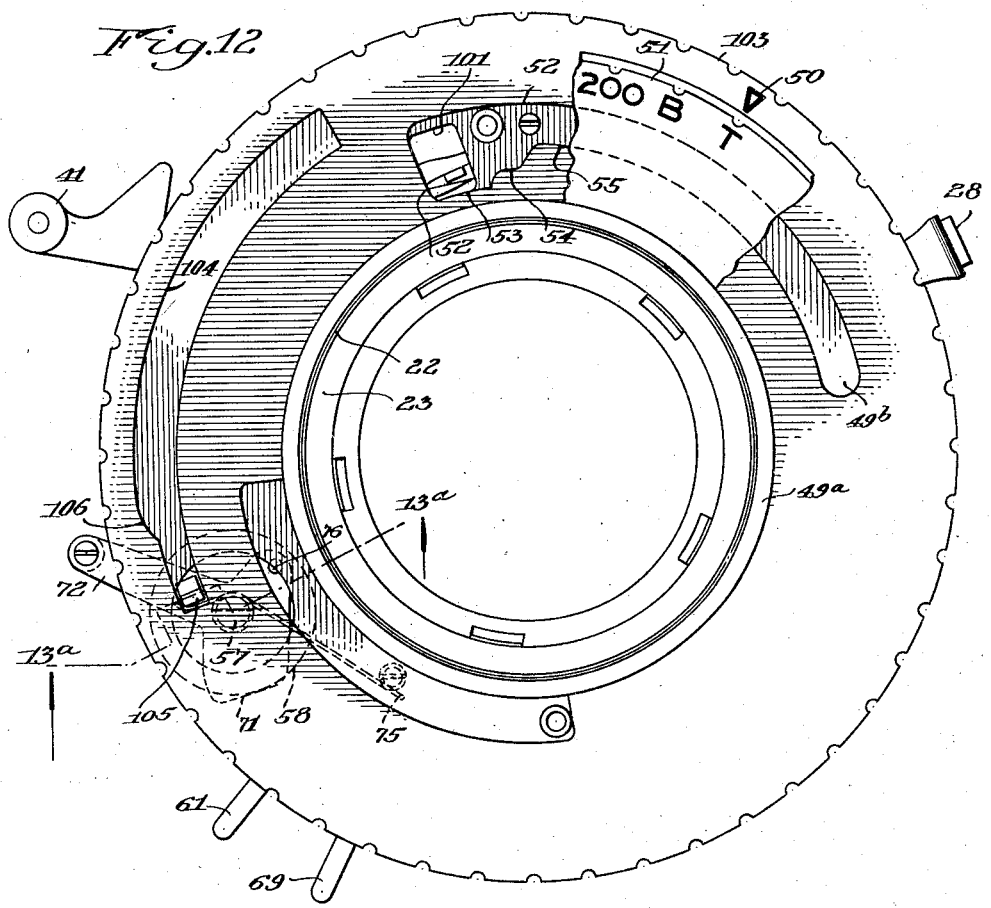
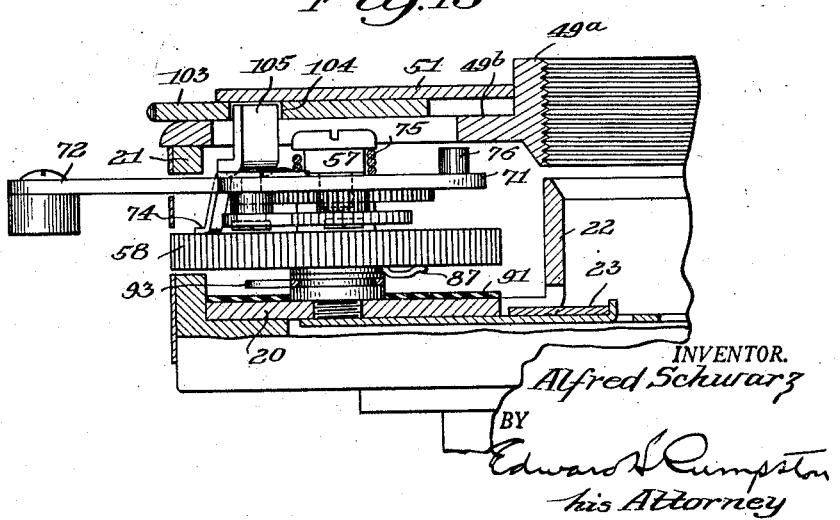
INVENTOR.
Alfred Schwarz
BY Edward H. Cumpston
his Attorney Patented Jan. 27, 1948

2,435,161

UNITED STATES PATENT OFFICE 2,435,161

PHOTOFLASH SYNCHRONIZING MECHANISM

Alfred Schwarz, Rochester, N. Y., assignor to Ilex Optical Company, Rochester, N. Y., a corporation of New York Application April 21, 1944, Serial No. 532,123

12 Claims. (Cl. 95—11.5)

This invention relates to photoflash synchronizing mechanism for cameras and, more particularly, to means for protecting the flash bulb against being inadvertently flashed and wasted by improper manipulation of the operating parts, the invention being applicable, for example, to shutter and synchronizer mechanism such as disclosed in my United States Patents Nos. 2,355,825 and 2,358,941.

In such a mechanism, it may happen that the photographer, having adjusted the timing device of the shutter for a "time" or "bulb" exposure, as desired, mistakenly operates the synchronizer unit, with the result that the bulb is unintentionally flashed and wasted.

Thus in a synchronizing mechanism such as described in my said patents, the regular release lever is employed to operate the synchronizing mechanism, whenever the latter is set to active position, and the synchronizing mechanism then acts to release the master member for operation only at instantaneous speeds, regardless of setting of the timing device at the "T" or "B" positions. Notwithstanding such operation of the shutter blades at instantaneous speeds, it is still possible for the photographer to set the device at "T," for example, operate the finger release lever to open the shutter blades and then inadvertently set the synchronizing mechanism for action while the shutter is still open. The operation of the parts in such order, with a flash bulb in the circuit, results in flashing and wasting the bulb as the synchronizing mechanism is set to active position. The same wastage of bulb may also occur in case the timing device is set at "T" or "B," the synchronizing mechanism is set to active position and the finger release lever is then operated, the shutter being opened and closed, in that case, at an instantaneous but inappropriate speed.

An object of the invention, therefore, is to provide a shutter having such a synchronizing mechanism comprising means to render it "foolproof" against such inadvertent operation of the parts.

Another object is to provide a shutter and synchronizing mechanism of the character described with a safety means for obstructing operation of the synchronizing mechanism when the timing device is set to some inappropriate position such as "T" or "B."

A further object is to provide mechanism comprising safety means of such a nature having a simple and efficient construction operated automatically to render the synchronizing mechanism inoperative when the timing device is set to the "T" or "B" position.

To these and other ends the invention resides in certain improvements and combinations of parts, all as will be hereinafter more fully described, the novel features being pointed out in the claims at the end of the specification.

In the drawings:

Fig. 1 is a plan view of a shutter casing, partly broken away, showing a shutter and synchronizer mechanism having the present invention applied thereto, the timing device being adjusted for an instantaneous exposure and the synchronizer having been released by the releasing lever and having in turn released the master member to open the blades and close the bulb circuit;

Fig. 2 is a fragmentary view of some of the parts shown in Fig. 1, but showing the master lever locked in set position;

Fig. 3 is a diagram showing the electrical circuit of the synchronizing mechanism;

Fig. 4a is a view similar to Fig. 2 but with the master lever released and showing additional parts including the levers for cooperation with the release lever in the "T" position of the timing device.

Fig. 7 is an enlarged view similar to Fig. 1, but prior to operation of the parts and showing more particularly the synchronizing mechanism and safety means;

Fig. 8 is a fragmentary view similar to Fig. 7, but showing the synchronizing mechanism set to active position;

Fig. 9 is an enlarged, sectional view on the line 9a—9a in Fig. 8;

Fig. 10 is a view similar to Fig. 1, but showing a modified construction, with the releasing lever about to release the synchronizer and the timing device set for an instantaneous exposure;

Fig. 11 is a fragmentary view similar to Fig. 10, with some parts omitted for clearer illustration;

Fig. 12 is a view similar to Fig. 10, but with the timing device at "T" and the finger release lever operated once to open the blades, the synchronizer mechanism being locked in inactive position, and Fig. 13 is an enlarged, sectional view on the line 13a—13a in Fig. 12.

Figure 4:
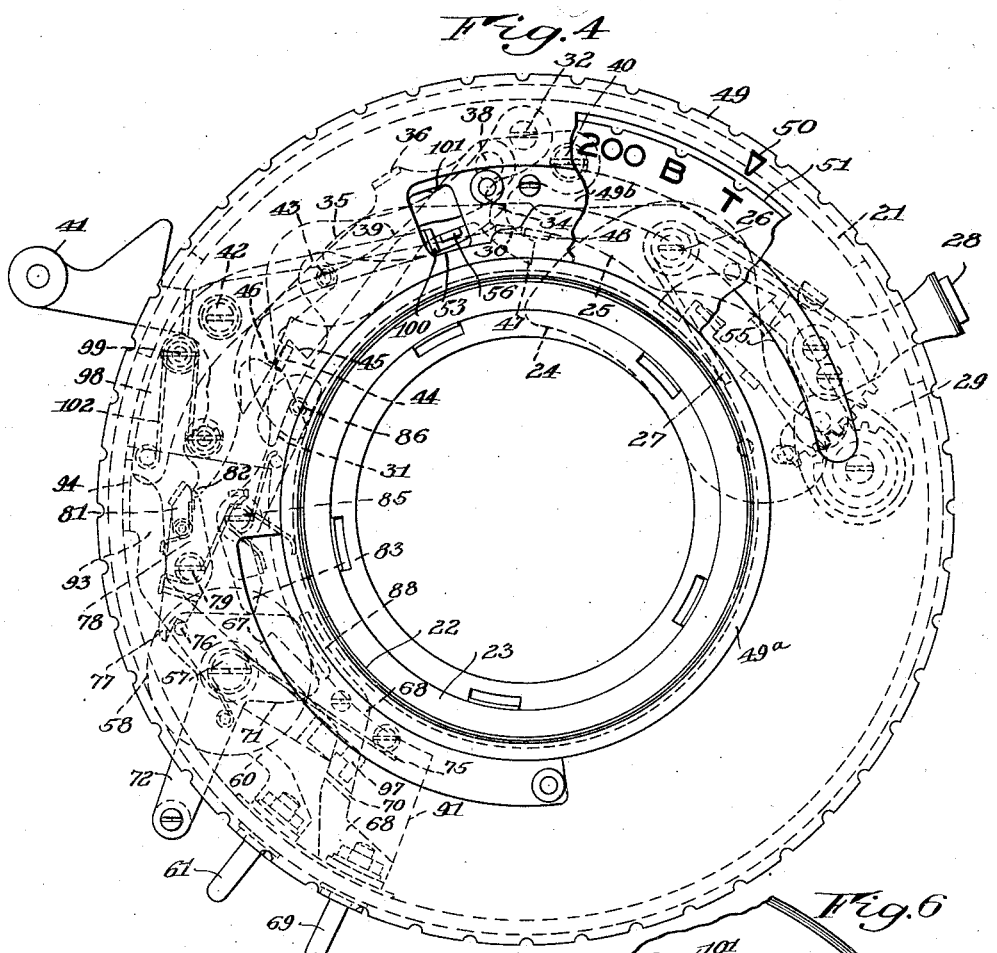
Fig 4 is a view similar to Fig. 1, showing the timing device set to "T" and the release lever operated to open the shutter blades, the synchronizer mechanism having been moved to set position but with its circuit held open by a safety device embodying the present invention.

The present invention comprises mechanism connecting the timing device of the shutter with the synchronizer and the shutter and synchronizer parts may be constructed, for example, as disclosed in my said Patent No. 2,358,941, as will now be briefly described.

The shutter comprises in the present instance an annular rear wall 20, Figs. 1 and 2, having an outer cylindrical flange 21 and an inner cylindrical flange 22, the shutter mechanism being mainly mounted on the wall 20 between the said flanges. The usual blade ring is shown at 23 for operating the usual series of blades 24 for opening and closing the exposure opening within the inner flange 22, as well understood in the art.

A master lever 25 is pivoted at 26 on the casing wall 20 and actuated by spring 27, as shown. The right hand end of lever 25, as shown in Fig. 1, carries a finger piece 28 projecting through an opening in the casing for setting the same against the tension of its spring, and this end of the master lever is connected with a blade actuating mechanism indicated generally at 29, which may have any known and suitable construction, as well understood in the art.

The master lever 25, on the other or left hand side of its pivot, has a depending lug 30 (Fig. 2) arranged to engage and move a pivoted locking lever 31, pivoted at 32 on the casing against the tension of a spring 33, lever 31 having a shoulder 34 over which the lug 30 of the master lever is snapped during such movement, to lock the master lever in set position. Lever 25, beyond lug 30, has an end 35 (Fig. 4a) arranged, when moved to set position, to engage a depending lug 36 on a lever 37 pivoted at 38 on a lever 39 pivoted at 40 on the wall of the casing. A spring 37a engaging lever 37 near its pivot 38, urges lever 37 and the lever 39 to which it is pivoted at 38, in an inward direction, this pair of levers 37 and 39 being formed at their ends for interlocking engagement with the usual finger release lever 41 when the shutter is set for a "time" exposure, as hereafter described.

Finger release lever 41 is pivoted on the casing at 42 and carries a pin 43 for engaging and swinging the locking lever 31 to release the master lever 25 and effect actuation thereby of the shutter blades. Releasing lever 41 is provided also with a lug 44 for cooperation with the ends of levers 37 and 39 when the timing device is set for "time" or "bulb" operation of the shutter. To this end lever 37 is formed with a shoulder 45 for engagement with one side of lug 44 of the releasing lever and lever 39 is recessed to provide a shoulder 46 for engagement with the opposite side of lug 44 of the releasing lever to control it for such "time" operation.

When the shutter timing device is positioned at "T," the setting of the master lever causes it to engage lug 36 on lever 37 and move the latter so that its shoulder 45 clears the path of lug 44 of the releasing lever. On the actuation of the latter, its pin 43 moves the locking lever to release the master lever, and lever 39 is moved by its spring until its shoulder 46 engages at one side of or behind lug 44 of the releasing lever, so as to prevent full return of lever 41 to initial position. Such movement of lever 39 carries a spur 47, projecting from its inner side, into the path of a lug 48 on the master member so as to arrest the movement of the latter with the shutter blades in open position. Such partial release of the master lever and movement of lever 39 allows the associated lever 37 to move inwardly until its shoulder 45 lies against the other side of lug 44 of the releasing lever. Upon a second actuation of the releasing lever, to close the shutter blades, its lug 44, pressing against shoulder 45, moves lever 37 and its associated lever 39 until the spur 47 on the latter releases lug 48 of the master member, which then completes its movement and closes the shutter blades.

Figures 5, 6:
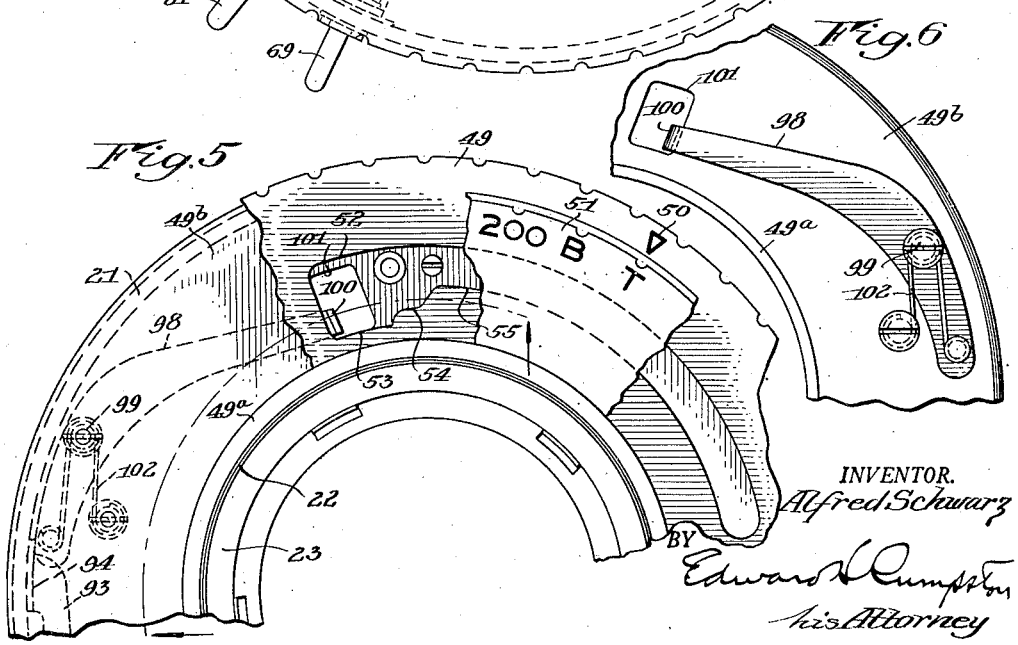
Fig. 5 is a view similar to Fig. 4, but showing some of the front parts of the shutter casing broken away to illustrate the operation of the timing device and safety means.
Fig. 6 is a fragmentary view similar to Fig. 5, but showing the opposite side of the front wall of the casing and the safety means.

The timing device for adjusting the shutter for instantaneous, time, or bulb exposures comprises, preferably, an annular ring 49 rotatably mounted on a flange 49a of a front wall 49b (Figs. 5 and 6), of the shutter and having a knurled edge to facilitate rotary adjustment. Ring 49 is provided with an index mark 50 adapted to be registered with divisions of a dial plate 51 also mounted on said front wall flange 49a, which divisions are marked to indicate a series of instantaneous exposures of varying duration, as represented by the mark "200" corresponding to $\frac{1}{200}$ of a second. The final divisions of the scale are marked "B" and "T" to indicate bulb and time settings, as well understood in the art. Ring 49 is formed with a cam slot (not shown) for engagement with portions of the retarding mechanism, to produce instantaneous exposures of varying duration, as well understood in the art, and is also formed with a slot 52 (Fig. 5), having a low portion 53, corresponding to a "time" exposure, a portion 54 of intermediate elevation corresponding to a "bulb" exposure, and a portion 55 of maximum elevation corresponding to a range of instantaneous exposures.

When the timing ring 49 is adjusted for an instantaneous exposure, as shown in Fig. 1, its highest cam portion 55 engages and lifts a lug 56 on lever 39, thereby raising the lever 39 out of the path of movement of lug 48 of the master lever 25, to permit full operation of the shutter for instantaneous exposures. When ring 49 is adjusted with its index in registry with the mark "B" on the dial, its intermediate cam portion 54 engages lug 56, raising lever 39 so as to clear lug 44 of the releasing lever, but leaving lever 39 low enough so that its spur 47 remains in the path of lug 48 and arrests the master lever 25 with the blades in open position, until lever 41 is released for return movement to initial position during which its lug 44 raises the end of lever 39 and releases the master member to close the shutter blades. With timing ring 49 adjusted to position its index opposite the "T" position on the dial, the lowest portion 53 of its cam slot allows lug 56 to move inwardly on actuation of the releasing lever, until lever 39 and its spur 47 move inwardly to arrest the master member with the shutter blades open. In this position levers 37 and 39 engage opposite sides of lug 44 as described, holding the releasing lever in intermediate position and the shutter blades open. A second actuation of the releasing lever causes its lug 44 to engage shoulder 45 and move the levers 37 and 39 to release the master member to close the blades. Cam slot 52 of the timing ring 49 is employed also to operate a safety device in accordance with the present invention as hereafter described.

The synchronizer mechanism, best shown in Figs. 7, 8 and 9, comprises a post 57 on wall 20 of the casing on which a disk 58 is mounted for rotary adjustment. The disk is made of insulating material and has fixed on its under side a conducting contact segment 59 with which engages an insulated contact 60 carried by a jack 61 preferably mounted on and insulated from the casing flange. On the opposite side of disk 58 is a conducting segment 62 electrically connected through the disk, as by means of a screw 63, with the segment 59 on its opposite side. Parallel with segment 62 is a segment 64 having one end electrically connected through the disk, as by means of a screw 65, with a conducting segment 66 on the opposite side of the disk. Engaging the latter is a spring contact 67 on an angular plate 68 leading to the other jack 69, except for a gap 70, the purpose of which will be hereafter explained. Jack 69 is mounted and preferably insulated from the casing flange, as shown, and the parts of plate 68 are preferably insulated as hereafter described.

Rotatably mounted on post 57 also is a plate 71 having an actuating arm 72 extending through a slot in the casing flange. Plate 71 carries also a pair of connected spring contact fingers 73 and 74, one for engagement with each of the segments 62 and 64, respectively. Plate 71 is actuated by means of a spring 75 to normally carry arm 72 to the released position shown in Fig. 7, in which contact fingers 73 and 74 bridge and connect the segments 62 and 64 to complete the synchronizer circuit including the flashlight bulb. When arm 72 is moved against its spring, to the set position shown in Fig. 8, however, contact finger 73 is disconnected from the end of segment 64, to interrupt the circuit, and the time of closing of the circuit, for flashing the bulb, is regulated by rotarily adjusting the disk 58 carrying the segments 62 and 64, so as to vary the instant of closing contact of finger 73 with segment 64 when plate 71 and its contacts 73 and 74 are released. Plate 71 and its arm 72 are latched in this set position by means which will now be described.

Plate 71 carries a pin 76 and when the synchronizer is moved to set position, one end of this pin engages the notched end 77 of a latch lever 78 pivoted at 79 on the casing and actuated by a spring 80, so as to latch the synchronizer in set position. The opposite end of lever 78 is provided with a spring actuated pawl 81 which, in latched position, lies in the path of inward movement of a finger 82 on releasing lever 41, pawl 81 being arranged to yield idly to permit finger 82 to move outwardly to its initial position. With the synchronizer latched in set position, as shown in Fig. 8, depression of the releasing lever swings the latch clockwise to release the synchronizer plate 71 to carry its contact 73 into closing engagement with segment 64.

During the release or return of the synchronizer plate 71 to initial position, its pin 76 engages a spring actuated pawl 83 on a spring actuated lever 84 pivoted at 85 on the casing. Lever 84 is provided with a pin 86 arranged to engage the end of locking lever 31, as shown in Fig. 1, to thereby release the master lever to open and close the shutter. Pawl 83 yields idly to permit pin 76 to move in the opposite direction to set position. In this operation, the latching lever, reaching its limit of movement, obstructs further movement of the releasing lever so as to prevent it from actuating the locking lever which is actuated instead by the synchronizer through its lever 84, as described.

The above described adjustments of the synchronizer are particularly adapted for use with commercial flash bulbs having some appreciable time lag in reaching maximum illumination after closing of the circuit and, to complete its range of adaptability, the mechanism is adapted for use also with flash bulbs of the known "Kodatron," or instantaneous type, having a zero time lag. For this purpose, synchronizer disk 58 may be rotated so that its conducting segment 59 connects the jack contact finger 60 with a spring contact 87 on post 57, thereby grounding one side of the circuit to the shutter casing. The plate 68 from the other jack has a branching spring contact finger 88 bearing against the blade ring 23 through an opening 88a in the portion of the casing in which it is housed. The blade ring is provided in this locality with an insulated surface 89 with which contact finger 88 contacts in the closed position of the shutter. At one end of this insulated surface 83, however, is a conducting surface 90 in electrical connection with the ring and positioned to engage contact finger 88 at the instant of full opening of the shutter, to complete the circuit through a "Kodatron" bulb at the instant of full shutter opening. The periphery of disk 58 is knurled and projects slightly through an opening in the casing flange and the parts are suitably marked to indicate the proper setting of the disk for each desired time of operation of the synchronizer.

It will be noted in Fig. 7 that in the released, or initial position of the synchronizer, the contacts are so positioned that the flash bulb circuit is closed and, in this arrangement of the parts, the insertion in the circuit of the flashlight bulb might result in its inadvertent flashing and waste. Even in the set position of the synchronizer, with the bulb in the circuit, the circuit may be closed to flash and waste the bulb by some inadvertent short-circuiting of some of the parts. To guard against this undesired result, the synchronizer circuit is preferably provided with an automatic safety switch which is conjointly controlled by both the synchronizer and the releasing lever 41, so that the circuit is closed only while the synchronizer is set and the releasing lever is being actuated. For this purpose the wall 20 of the casing is surfaced, adjacent the synchronizer, with a sheet 91 (Fig. 7) of insulating material, a portion of which is continued up the outer flange as at 92. A conducting lever 93 is pivoted on post 57 and has one end flanged angularly, as at 94, and moved away from the insulating material on the casing flange under actuation of a spring 95. This end 94 of the lever is positioned for engagement by finger 82 of releasing lever 41, in its inactive position, and also by the pawl 81 of the synchronizer latch 78 when in its unlatched position, these parts 81 and 82 tending to hold the lever end 94 against the insulated casing flange, as shown in Fig. 7. The opposite end of lever 93 is provided with a block of insulating material 96 on which is fixed a switch contact 97 arranged to slide in contact with both parts of plate 68 adjacent the interruption 70 therein. In the described position of the lever with its end 94 against the casing flange, contact 97 lies at one side of the interruption 70, but when the synchronizer is set and the releasing lever is actuated, the lever end 94 is released and the lever is moved by its spring to move its contact 97 so as to bridge the gap 70 in plate 68 and thus close the synchronizer circuit, only after the synchronizer has been set, however, and the releasing lever is being actuated to effect an exposure.

It occasionally happens, however, even with the above safeguards, that the shutter parts are inadvertently operated in such a manner as to produce the flashing and waste of a bulb, and the invention provides a further safeguard to obviate such inadvertent wastage of bulbs and so increase the "fool-proof" character of the apparatus. It sometimes happens, for example, that with the time device set at "T," the photographer first depresses the finger release lever 41 to open the shutter and then depresses the setting lever 72 of the synchronizer, with the result that the safety switch lever 93 is released with the disk 58 in such position that the segments 62 and 64 are still bridged by the contact fingers 73 and 74, so that the circuit is closed and the bulb is flashed and wasted with the shutter held open. Or with the timing device set at "T" and the master lever in set position, the synchronizer lever may be inadvertently depressed, and the releasing lever 41 then depressed, with the result that the blades are opened, the bulb flashed and the blades closed, but with an unsuitable instantaneous exposure.

I have found that such inadvertent operation of the parts may be prevented by a suitable connection between the timing device and the safety switch included in the synchronizer circuit, operating to obstruct the closing of the circuit when the timing device is set at "T" or "B." For this purpose, for example, I have provided lever means operated by the edge of the cam slot 52 of the timing device and arranged to hold switch lever 93 in circuit opening position so long as the timing device is set at "T" or "B." Such means preferably comprises a lever 98 (Figs. 5 and 6), pivoted at 99 on the inside of the front wall 49b of the casing and having one end turned angularly to provide a lug 100 projecting forwardly through the same opening 101 in the casing front wall as the lug 56 of lever 39. Lever 98 is actuated by a spring 102 so that its lug 100 rests upon the edge of the cam slot 52 of the timing ring 49, with the result that this end of the lever 98 is elevated when the timing ring is set at "T" or "B."

The opposite end of lever 98 is positioned for engagement with the flanged end 94 of safety switch lever 93. When the timing ring is set for an instantaneous exposure, as in Fig. 1, the lug 100 of lever 98 rests upon the elevated portion 55 of the cam slot edge and the opposite end of the lever is thus swung out of the range of movement of the flanged end 94 of the switch lever 93, leaving the latter to be conjointly controlled by the releasing lever 41 and the synchronizer for safeguarding the flash bulb circuit. However, when the timing ring is set at "T" or "B," as in Figs. 4 to 6, inclusive, lug 100 of lever 98 is lowered to one of the positions 53 or 54 on the cam slot edge, with the result that the opposite end of the lever is raised to obstruct the flanged end 94 of the switch lever 93 and thus prevent the switch from closing the bulb circuit. By such means the closing of the bulb circuit is prevented whenever the timing device is set at "T" or "B," regardless of the manipulation of the releasing lever and synchronizer.

In the modification described above, the closing of the synchronizer circuit is obstructed by directly obstructing the closing of the safety switch with which the synchronizer circuit is provided. Such construction has the advantage of accomplishing the desired result, without obstructing any of the manually operable parts of the mechanism and without subjecting any of the parts to mechanical strains which might derange and injure them. I have found that the desired purpose may be advantageously accomplished also by a modified construction, one embodiment of which is shown in Figs. 10 to 13 of the drawings. In this modification the above described lever 98 is omitted and instead the timing ring 103 has formed therein a concentric slot 104 embracing a lug 105 fixed on plate 71 of the synchronizer. The outer edge of the slot is inclined inwardly adjacent one end, as at 106, to narrow the end of the slot at which it closely embraces lug 105 of the synchronizer plate when the timing ring is set at "T" or "B." When the timing ring is set for any instantaneous exposure (Figs. 10 and 11), the lug 105 lies in the outer portion of the slot, which is wide enough to permit operation of the synchronizer, but with the timing device set at "T" or "B," the synchronizer plate 71 and lever 72 are locked in the inactive or unlatched position shown in Fig. 12, in which latching lever 78 remains with its pawl 81 spring pressed against the flange 94 of the safety switch lever 78, thereby maintaining the safety switch lever in such position that its contact 97 lies at one side of the gap 70 of plate 68, with the circuit thus held open so long as the timing ring is set at "T" or "B," as in the modification described above. By thus locking the synchronizer lever against movement, the photographer is warned that he is attempting an improper operation of the mechanism.

Both species of the construction embodying the invention are adapted to effectively and reliably accomplish the intended purpose and are of a relatively simple nature capable of being readily and inexpensively manufactured and compactly built into the shutter casing along with the synchronizer mechanism.

It will thus be seen that the invention accomplishes its objects, and while it has been herein disclosed by reference to the specific details of certain embodiments, it is to be understood that such disclosure is intended in an illustrative, rather than a limiting sense, as it is contemplated that various other changes and modifications in the construction and arrangement of the parts will readily occur to those skilled in the art within the spirit of the invention and the scope of the appended claims.

I claim:

1. A photographic shutter comprising blade means having a timing device adapted to be selectively positioned for effecting "time" or "bulb" operation of said means, a photoflash synchronizer mechanism comprising a flash bulb circuit, an actuating connection between said shutter and mechanism, an element movable to and from position for obstructing the operation of said mechanism and a connection between said element and said device, actuated by the positioning of said device for "time" or "bulb" operation of said means, for moving said element to obstruct said mechanism.

2. A photographic shutter comprising blade means having a timing device adapted to be selectively positioned for effecting "time" or "bulb" operation of said means, a photoflash synchronizer mechanism having a flash bulb circuit including a switch, an actuating connection between said shutter and mechanism, and means actuated by the positioning of said device for "time" or "bulb" operation of said blade means, for controlling operation of said switch.

3. A photographic shutter comprising blade means having a timing device adapted to be selectively positioned for effecting "time" or "bulb" operation of said means, a photoflash synchronizer mechanism having a flash bulb circuit including a switch, an actuating connection between said shutter and mechanism, an element movable to and from position for obstructing the closing of said switch, and a connection between said element and said device, actuated by the positioning of said device for "time" or "bulb" operation of said means, for moving said element to obstruct the closing of said switch.

4. A photographic shutter comprising blade means, a spring actuated master member adapted to be set to position for operating said blade means, a release member for releasing said master member, a timing device adapted to be selectively positioned for effecting "time" or "bulb" operation of said blade means, a photoflash synchronizer mechanism having a flash bulb circuit including a switch, a connection between said release member and said switch for controlling said switch, and a connection between said timing device and said switch, actuated by the positioning of said device for "time" or "bulb" operation of said blade means, for controlling said switch conjointly with said release member.

5. A photographic shutter comprising blade means, a timing device adapted to be selectively positioned for effecting "time" or "bulb" operation of said blade means, a spring actuated photoflash synchronizer mechanism adapted to be set to operating position and having a flash bulb circuit, a switch in said circuit means operated by said shutter for actuating said mechanism, a connection between said mechanism and switch for controlling said switch, and a connection between said timing device and said switch, actuated by the positioning of said device for "time" or "bulb" operation of said blade means, for controlling said switch conjointly with said synchronizer mechanism.

6. A photographic shutter comprising blade means, a spring actuated master member adapted to be set to position for operating said blade means, a release member for releasing said master member, a timing device adapted to be selectively positioned for effecting "time" or "bulb" operation of said blade means, a spring actuated photoflash synchronizer mechanism adapted to be set to operating position independently of said release member and having a flash bulb circuit, a switch in said circuit means operated by said release member for actuating said mechanism, connections from said release member and said mechanism to said switch, and a connection from said timing device to said switch, actuated by the positioning of said device for "time" or "bulb" operation of said blade means, for conjointly controlling said switch.

7. A photographic shutter comprising blade means, a timing device adapted to be selectively positioned for effecting "time" or "bulb" operation of said blade means, a photoflash synchronizer mechanism having a flash bulb circuit, an actuating connection between said shutter and said mechanism, a switch in said circuit having spring means for closing the same, and a connection between said timing device and said switch, for holding said switch open when said device is positioned for "time" or "bulb" operation of said blade means.

8. A photographic shutter comprising blade means, a timing device adapted to be selectively positioned for effecting "time" or "bulb" operation of said blade means, a photoflash synchronizer mechanism having a flash bulb circuit, an actuating connection between said shutter and said mechanism, a switch in said circuit having spring means for closing the same, and means comprising a lever actuated by the positioning of said timing device for "time" or "bulb" operation of said blade means, for holding said switch in open position.

9. A photographic shutter comprising blade means having a timing device adapted to be selectively positioned for effecting "time" and "bulb" operation of said means, a photoflash synchronizer mechanism including a flash bulb circuit and having a setting movement, an actuating connection between said shutter and said mechanism an element movable to and from position for obstructing said movement of said mechanism, and a connection between said element and said device, actuated by the positioning of said device for "time" or "bulb" operation of said means, for moving said element to obstruct the movement of said mechanism.

10. A photographic shutter comprising blade means, a spring actuated master member for operating said blade means, a release member for releasing said master member, a timing device adapted to be selectively positioned for effecting "time" and "bulb" operation of said blade means, a spring actuated photoflash synchronizer mechanism including a flash bulb circuit and having a setting movement independent of said release member, an actuating connection between said release member and said mechanism, and a connection between said timing device and said mechanism for obstructing movement of said mechanism when said device is moved to position for "time" or "bulb" operation of said blade means.

11. A photographic shutter comprising blade means, a spring actuated master member for operating said blade means, a manually operable release member for releasing said master member, a timing device adapted to be selectively positioned for effecting "time" and "bulb" operation of said blade means, a photoflash synchronizer mechanism including a flash bulb circuit, manually operable means for setting said mechanism to active position, an actuating connection between said release member and said mechanism, and a connection between said timing device and said mechanism for obstructing movement of said mechanism when said device is moved to position for "time" or "bulb" operation of said blade means.

12. A photographic shutter comprising a casing, blade means in said casing, a spring actuated master member in said casing for operating said blade means, a manually operable release member in said casing for releasing said master member, a timing device adapted to be selectively positioned for effecting "time" and "bulb" operation of said blade means, a photoflash synchronizer mechanism in said casing including a flash bulb circuit, manual means operable independently of said release member for setting said mechanism to active position, an actuating connection between said release member and said mechanism, and a connection in said casing between said timing device and said mechanism for automatically obstructing movement of said mechanism when said device is moved to position for "time" or "bulb" operation of said blade means.

ALFRED SCHWARZ.

REFERENCES CITED

The following references are of record in the file of this patent:

UNITED STATES PATENTS

| Number | Name | Date |
| --- | --- | --- |
| 2,319,086 | Riddell | May 11, 1943 |
| 2,355,825 | Schwarz | Aug. 15, 1944 |
| 2,358,941 | Schwarz | Sept. 26, 1944 |